G. M. HOPKINS.
Galvanic-Battery.

No. 219,477.    Patented Sept. 9, 1879.

WITNESSES:
C. Neveux
E. L. Topliff

INVENTOR:
Geo. M. Hopkins

UNITED STATES PATENT OFFICE.

GEORGE M. HOPKINS, OF NEW YORK, ASSIGNOR TO HIMSELF AND CYRUS L. TOPLIFF, OF BROOKLYN, N. Y.

IMPROVEMENT IN GALVANIC BATTERIES.

Specification forming part of Letters Patent No. 219,477, dated September 9, 1879; application filed November 26, 1878.

*To all whom it may concern:*

Be it known that I, GEORGE M. HOPKINS, of the city, county, and State of New York, have invented a new and useful Improvement in Galvanic Batteries; and I do hereby declare that the following is a full, clear, and exact description of the same, reference being had to the accompanying drawings, in which—

Figure 1:
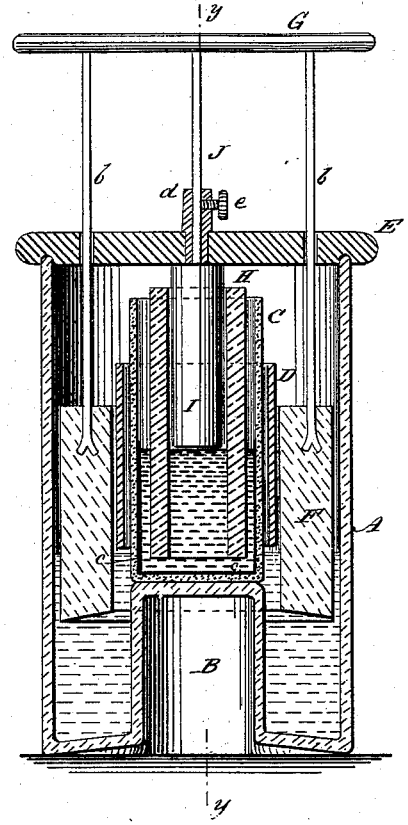
Figure 2:
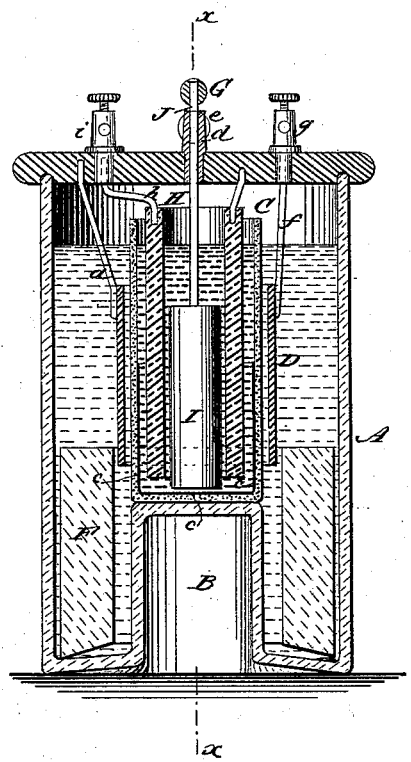

Figure 1 is a vertical transverse section taken on line $x\ x$ in Fig. 2, and showing the battery in condition for rest. Fig. 2 is a vertical transverse section taken on line $y\ y$ in Fig. 1, showing the battery in condition for action.

My improvement relates to that class of galvanic batteries in which two fluids and a porous diaphragm are used; and it consists in devices for displacing the two fluids, so as to cause them to envelop the two poles of the battery and the upper portion of its diaphragm, the latter having a glazed lower portion, for preventing the mixture of the two fluids when the battery is not in operation.

The object of the invention is to prevent action on the zinc and to avoid the intermixture of the two battery-fluids when the battery is not in use, thus prolonging the usefulness of the battery, and avoiding the necessity of frequent cleaning.

In the bottom of the jar A there is an elevated portion, B, upon which rests the porous cell C. The hollow cylindrical zinc D surrounds the porous cell, and is suspended by wires $a$ from the cover E. An annular plunger, F, surrounds the elevated portion of the bottom, and is of sufficient internal diameter to move readily up or down over the zinc. This plunger is connected by two rods, $b$, which extend through holes in the cover E, with the cross-bar G.

The porous cell C is furnished with a lining, $c$, which covers the bottom and extends from one-third to one-half the distance from the bottom to the top of the cell. This lining may consist of glazing, such as is commonly applied to pottery, or a coating of battery-cement or gutta-percha, or even common sealing-wax may answer the purpose. The portion of the porous cell thus coated contains a sufficient quantity of the exciting-fluid to fill the entire cell when displaced by the means presently described.

In some instances the glazing or other coating will be applied to the outside of the porous cell instead of the inside, the requirement being that the coated or non-porous side of the cell shall be in contact with the more crystallizable fluid.

The object of coating one side of the porous cell so as to render it non-porous is to prevent the intermixture of the two exciting-fluids. The object of allowing one side of the wall of the cell to remain porous is to allow the fluid which is least liable to crystallize to fill the entire wall of the cell by capillarity, so that it is always in a moist condition and ready for instant action.

When time is of no special importance, and the fluids used are not liable to crystallization, the porous cell may be coated or glazed on both sides for a portion of its length from the bottom upward.

By reference to Fig. 1 it will be seen that the lower end of the porous cell dips more or less in the outer solution when the plunger F is raised.

The porous cell C contains, in the present case, a hollow cylindrical carbon, H, which is suspended from the cover by a wire, and within it there is a cylindrical plunger, I, which is connected by a rod, J, with the cross-bar G. In the cover E there is a sleeve, $d$, through which the rod J passes. This sleeve is provided with a set-screw, $e$, by which the rod J may be clamped in any position.

When the plungers F I are drawn up as high as possible, the outer fluid retreats below the zinc, but maintains its connection with the porous cell, and the exciting-fluid in the porous cell retreats into the glazed or non-porous portion. In this condition the battery may remain for an indefinite time, it being only necessary to supply the water lost by evaporation.

When it is desired to use the battery, the set-screw $e$ is loosened and the plungers F I are pushed down into the fluids, displacing them so that the zinc, the carbon, and the porous cell are properly covered.

A wire, *f*, from the zinc D communicates with the binding-post *g*, fastened to the cover; and a wire, *h*, from the carbon H communicates with the binding-post *i*, also secured to the cover.

As the battery may be made in various forms, I do not limit or confine my invention to the exact construction and arrangement herein shown and described.

Having described my invention, I claim—

1. A galvanic battery in which the two liquids are so displaced by the plungers F I as to cause them to envelop the two poles of the battery and the upper portion of its diaphragm.

2. In a galvanic battery, the plungers F I, for displacing the battery-fluids.

3. In a galvanic battery, the porous diaphragm C, having a non-porous portion, *c*, for the reception of the exciting-fluid, in combination with the fluid-displacing plunger I.

4. Two plungers connected by rods with a single cross-bar, in combination with the fluid-containing compartments or receptacles of a galvanic battery.

GEO. M. HOPKINS.

Witnesses:
C. L. TOPLIFF,
C. SEDGWICK.